US010512122B2

(12) United States Patent
Schlipf

(10) Patent No.: US 10,512,122 B2
(45) Date of Patent: Dec. 17, 2019

(54) ELECTRICAL CARTRIDGE TYPE HEATER WITH TEMPERATURE MONITORING AND ELECTRICAL HEATER WITH TEMPERATURE MONITORING

(71) Applicant: TÜRK & HILLINGER GMBH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 604 days.

(21) Appl. No.: 15/254,428

(22) Filed: Sep. 1, 2016

(65) Prior Publication Data

US 2017/0071030 A1 Mar. 9, 2017

(30) Foreign Application Priority Data

Sep. 4, 2015 (DE) .................... 20 2015 104 723 U

(51) Int. Cl.
*H05B 1/02* (2006.01)
*H05B 3/48* (2006.01)
(Continued)

(52) U.S. Cl.
CPC ............. *H05B 1/02* (2013.01); *H05B 1/0291* (2013.01); *H05B 3/06* (2013.01); *H05B 3/44* (2013.01);
(Continued)

(58) Field of Classification Search
CPC .......... H05B 1/02; H05B 1/0291; H05B 3/06; H05B 3/44; H05B 3/48; H05B 2203/002; H05B 2203/014
(Continued)

(56) References Cited

U.S. PATENT DOCUMENTS 3,890,485 A * 6/1975 Kozbelt .................. G01K 1/14 219/494
3,920,963 A * 11/1975 Beasley .................. G01K 7/04 219/494
(Continued)

FOREIGN PATENT DOCUMENTS

CN 2446744 Y 9/2001
CN 1399497 A 2/2003
(Continued)

*Primary Examiner* — Mark H Paschall
(74) *Attorney, Agent, or Firm* — McGlew and Tuttle, P.C.

(57) ABSTRACT

An electrical cartridge type heater (100) includes an outer metallic jacket (110) an electrical heating element (120, 121) arranged in an interior space (140) of the outer metallic jacket (110) and a device for monitoring the temperature (130), which is galvanically separated from the electrical heating element (120, 121) and is arranged in the interior space (140) of the outer metallic jacket (110). The device for monitoring the temperature (130) includes a wire or a tube, in addition to the electrical heating element (120, 121), made of a material that changes resistance with temperature change with a value of the temperature coefficient of the electrical resistance greater than 800 ppm/K, and especially preferably greater than 4,000 ppm/K between 20° C. and 105° C. The wire or the tube is directly embedded into an electrically non-conducting filler filling a remaining interior space (140) of the outer metallic jacket (110).

8 Claims, 7 Drawing Sheets

(51) Int. Cl.
*H05B 3/06* (2006.01)
*H05B 3/44* (2006.01)

(52) U.S. Cl.
CPC ......... *H05B 3/48* (2013.01); *H05B 2203/002* (2013.01); *H05B 2203/014* (2013.01)

(58) Field of Classification Search
USPC ....... 219/505, 497, 534, 544, 538, 540, 546, 219/548
See application file for complete search history.

(56) References Cited

U.S. PATENT DOCUMENTS

| | | | | | |
|---|---|---|---|---|---|
| 3,947,656 | A * | 3/1976 | Lodi | B29C 65/18 219/243 |
| 4,617,455 | A | 10/1986 | Schwarzkopf | |
| 5,247,158 | A * | 9/1993 | Steinhauser | H05B 3/46 219/534 |
| 5,973,296 | A * | 10/1999 | Juliano | B29C 45/2737 219/424 |
| 6,486,442 | B2 * | 11/2002 | Wheeler | H05B 3/44 219/243 |
| 7,377,768 | B2 * | 5/2008 | Gellert | B23P 15/007 264/328.15 |
| 10,182,471 | B2 * | 1/2019 | Crandell | H05B 3/46 |
| 2003/0218004 | A1 * | 11/2003 | Yoneyama | B62D 1/065 219/528 |
| 2008/0000893 | A1 | 1/2008 | Wittenhagen et al. | |
| 2008/0210684 | A1 * | 9/2008 | Kukino | B28B 11/242 219/542 |
| 2009/0032519 | A1 | 2/2009 | Schlipf | |
| 2011/0180529 | A1 * | 7/2011 | Schlipf | B29C 45/2737 219/534 |

FOREIGN PATENT DOCUMENTS

| | | | |
|---|---|---|---|
| CN | 101124851 | A | 2/2008 |
| CN | 104781616 | A | 7/2015 |
| DE | 80 17 616 | U1 | 1/1982 |
| DE | 34 43 306 | C1 | 4/1986 |
| DE | 203 21 257 | U1 | 7/2006 |
| DE | 20 2007 010 865 | U1 | 10/2007 |
| DE | 20 2007 001 789 | U1 | 6/2008 |
| DE | 10 2007 010 395 | A1 | 9/2008 |
| DE | 20 2008 014 050 | U1 | 1/2009 |
| DE | 10 2009 029 251 | B4 | 2/2015 |
| JP | 2012256496 | A | 12/2012 |

* cited by examiner

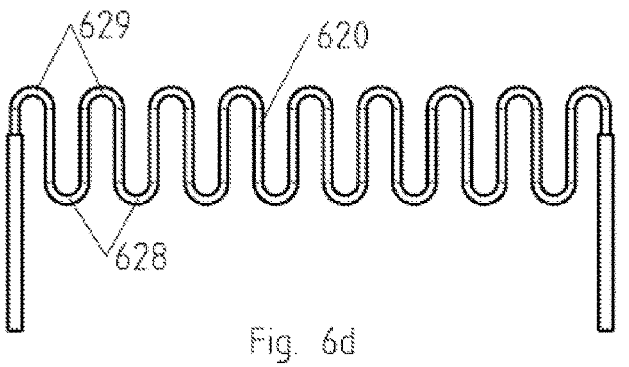
Fig. 6d
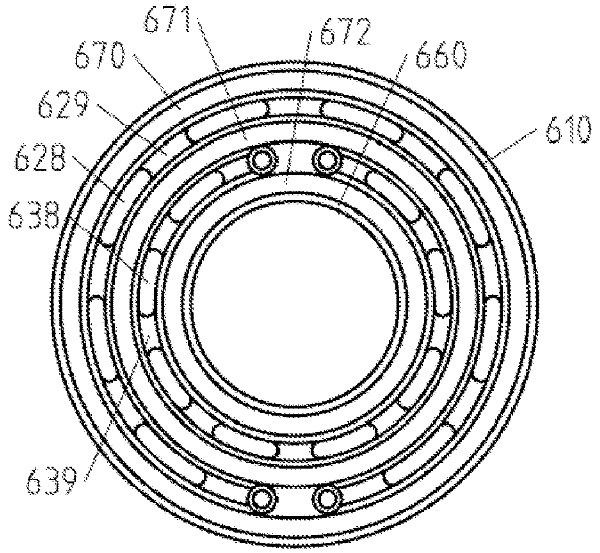
Fig. 6c
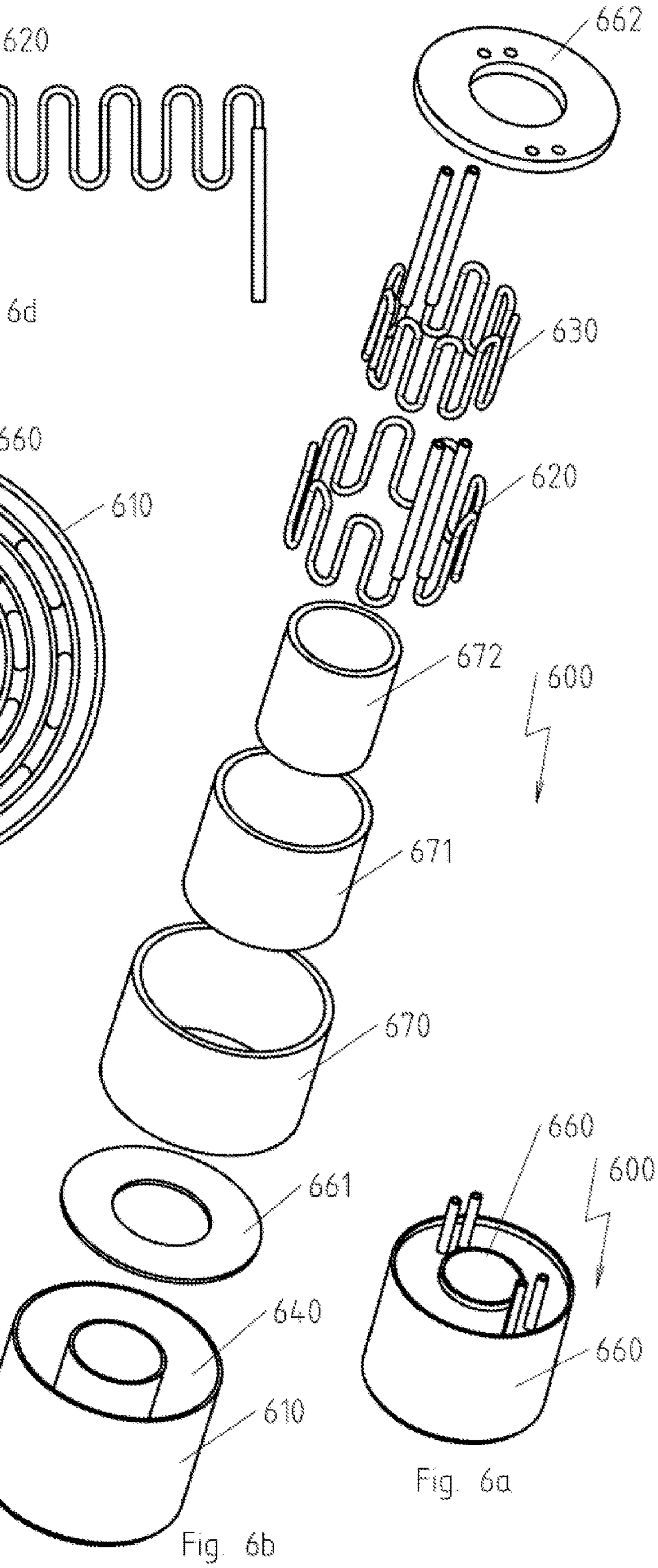
Fig. 6a
Fig. 6b

ELECTRICAL CARTRIDGE TYPE HEATER WITH TEMPERATURE MONITORING AND ELECTRICAL HEATER WITH TEMPERATURE MONITORING

CROSS REFERENCE TO RELATED APPLICATIONS

This application claims the benefit of priority under 35 U.S.C. § 119 of German Application 20 2015 104 723.1 filed Sep. 4, 2015, the entire contents of which are incorporated herein by reference.

FIELD OF THE INVENTION

The present invention pertains to an electrical cartridge type heater with an outer metallic jacket and with at least one electrical heating element arranged in an interior space of the outer metallic jacket, wherein at least one device for monitoring the temperature, which is galvanically separated from the electrical heating element, is arranged in the interior space of the outer metallic jacket of the electrical cartridge type heater.

BACKGROUND OF THE INVENTION

Electrical cartridge type heaters are a versatile kind of electrical heaters, in which an electrical heating element, which is typically configured as a hot wire or resistance wire, is arranged in the interior space of an outer jacket, the jacket often, but not necessarily, being formed by a tube, especially by a tube with a circular cross section. In this connection, this kind comprises, in addition to cartridge type heaters with only one metallic jacket, also hollow cartridges, which have a second, inner, often likewise tubular metallic jacket.

It is important in many applications in which such electrical cartridge type heaters are employed to monitor the operation of the electrical cartridge type heater, and it often is a question of reaching or maintaining a temperature at one or more points of the electrical cartridge type heater within a predefined temperature window as well. In order to make this possible, it is known, e.g., from DE 20 2008 014 050 U1 and DE 20 2007 010 865 U1 to arrange a temperature sensor or a temperature probe or an integrated thermocouple in the interior of the electrical cartridge type heater, which is, however, usually sensitive to pressure, which is to be taken into consideration in case of a crimping or compressing of the cartridge type heater. In addition, only a local monitoring of the temperature at one point is achieved in this way, so that a temperature deviation occurring at another point can only be detected if it has an effect on the locally monitored point.

Electrical heating elements with a temperature-dependent resistance behavior are known from DE 203 21 257 U1, for example.

SUMMARY OF THE INVENTION

Therefore, an object of the present invention is to provide an electrical cartridge type heater and an electrical heater with such a cartridge type heater, in which the above-mentioned drawbacks are avoided.

An electrical cartridge type heater according to the present invention has, as is usual for cartridge type heaters, an outer metallic jacket and at least one electrical heating element arranged in an interior space of the outer metallic jacket. Further, at least one device for monitoring the temperature, which is galvanically separated from the electrical heating element, is arranged in the interior space of the metallic jacket of the electrical cartridge type heater.

It is essential to the present invention that the device for monitoring the temperature be at least one wire present in addition to the electrical heating element or one tube present in addition to the electrical heating element, the wire or the tube being made of a cold-conducting material (PTC material)—a material that has an electrical resistance that increases with increased temperature such as used with a Positive Temperature Coefficient (PTC) thermistor in which a resistance increases as temperature rises. A value (absolute value) of the temperature coefficient of the electrical resistance is greater than 800 ppm/K, especially preferably greater than 4,000 ppm/K between 20° C. and 105° for this cold-conducting material. Furthermore, according to the present invention, the wire or the tube is directly embedded into an electrically non-conducting filler, which may be configured especially as MgO powder or MgO granules, filling the remaining interior space of the outer metallic jacket.

In an embodiment of the present invention alternative thereto, provisions may also be made, with otherwise the same configuration, for the wire present in addition to the electrical heating element or the tube present in addition to the electrical heating element as a device (thermistor) for monitoring the temperature to be made of a heat-conducting material (NTC material)—a material that has an electrical resistance that decreases with increased temperature such as used with a Negative Temperature Coefficient (NTC) thermistor in which a resistance that decreases as temperature rises. The value (absolute value) of the temperature coefficient of the electrical resistance being greater than 250 ppm/K, especially preferably greater than 800 ppm/K (for example −900 ppm/K if the temperature coefficient is negative) and most preferably greater than 4,000 ppm/K between 20° C. and 105° C. for this heat-conducting material. In this embodiment of the present invention as well, according to the present invention the wire or the tube is directly embedded into an electrically non-conducting filler, which may be configured especially as MgO powder or MgO granules, filling the remaining interior space of the outer metallic jacket.

The lower threshold of the necessary minimal value of the temperature coefficient of the electrical resistance between 20° C. and 105° C. for heat-conducting materials can be attributed to the fact that the resistance of the electrical heating element has, as a rule, a positive temperature coefficient of the electrical resistance between 20° C. and 105° C.

In both alternative embodiments of the present invention, it is possible to measure, for example, the resistance of the wire or tube or variables, which can be correlated with the resistance, e.g., currents flowing at a predefined voltage, or the voltage that is necessary for reaching a predefined current, and to carry out a comparison with standard values to achieve the monitoring of the temperature. This comparison is preferably carried out in an automated manner in an electronic control and/or monitoring unit for cartridge type heaters, data of a resistance characteristic stored in a memory of this electronic control and/or monitoring unit then being preferably accessed.

In addition to the greater robustness against pressure, which permits a compression of the electrical cartridge type heater, the configuration of the device for monitoring the temperature according to the present invention is characterized, besides by its extremely cost-effective feasibility, also in that the cartridge type heater can be annealed for bending, and especially also under protective gas, can be annealed under oxidizing or stress-relieved conditions after the compressing, which is not the case, for example, in the use of known PT-100 temperature sensors as a device for monitoring the temperature.

It is especially preferred when the wire or tube is made of a material, the resistance of which has a temperature coefficient, the value of which is at least twice as high, and especially preferably at least five times as high in the range between 20° C. and 105° C. as the value of the temperature coefficient of the resistance of the present electrical heating elements in the range between 20° C. and 105° C. This leads to the possibility of a sufficient accuracy of the temperature monitoring being guaranteed even in the case of possible resistance tolerances as a result of the compression.

If the device for monitoring the temperature is embodied in this way, a device for monitoring the temperature, in which the ambient temperature of each individual section of the wire or the tube made of cold-conducting or heat-conducting material contributes to the result of the temperature monitoring, is obtained in contrast to most devices for monitoring the temperature known at the priority date, which take a local temperature measurement. This may involve a faster response characteristic of the device for monitoring the temperature, since a change in temperature occurring locally because of a malfunction has a relatively direct effect on the nearest section of the wire or tube made of cold-conducting or heat-conducting material and thus one does not have to wait until the malfunction is manifested at the point monitored locally with a sensor or thermocouple.

In addition, in contrast to the use of the temperature sensors, temperature probes or thermocouples known from the state of the art, a device for monitoring the temperature is obtained, which is mostly insensitive to pressure and the operating current or operating voltage of which is set such that the temperature dependence of this resistance influences the heat output nonessentially only, while optimization of the compression of the electrical cartridge type heater without additional effort for the mechanical protection of the device for monitoring the temperature is made possible. Accordingly, it is especially preferred when the electrical cartridge type heater is compressed or crimped in at least some sections, wherein at least one section of the wire or tube present as a device for monitoring the temperature runs in at least one compressed or crimped section.

According to a preferred embodiment of the present invention, provisions are made for the device for monitoring the temperature to be configured as a tube made of a cold-conducting material or made of a heat-conducting material, and for the electrical heating element to be arranged in the interior space of this tube, so that the tube and the electrical heating element together form a coiled tube cartridge, the jacket of which represents the device for monitoring the temperature. For electrical heating elements configured as a hot wire or resistance wire, this implies that they are electrically insulated from the tube forming the device for monitoring the temperature, for example, by means of an insulating material filling, which can be accomplished, e.g., with magnesium oxide powder or granules.

In an especially preferred embodiment of the present invention, the wire present as a device for monitoring the temperature or the tube present as a device for monitoring the temperature is coiled. This makes possible a first variant of the present invention, in which the wire present as a device for monitoring the temperature or the tube present as a device for monitoring the temperature is wound together with at least one heating element, but galvanically separated from same, on a common coil body. Consequently, an especially simple manufacture of an electrical cartridge type heater with a device for monitoring the temperature is made possible.

As an alternative or in addition to the variant of the present invention described above, the wire present as a device for monitoring the temperature or the tube present as a device for monitoring the temperature can be configured as coiled with different coil pitches. As was already mentioned further above, in the configuration of the device for monitoring the temperature according to the present invention, the ambient temperature of each individual section of the wire or tube made of cold-conducting or heat-conducting material contributes to the result of monitoring the temperature. In a low coil pitch in a given area of the electrical cartridge type heater, an extension of the section of the wire or tube affected by the change in the temperature in this area is achieved in this area, which leads to an increased sensitivity of the device for monitoring the temperature to changes in temperature in this area, while, conversely, areas with low sensitivity can be created by high coil pitches. Thus, due to different coil pitches in a device for monitoring the temperature according to the present invention, the sensitivity thereof can be configured variably in different sections of the electrical cartridge type heater and be optimally adapted to the requirements of the application.

According to another advantageous embodiment of the present invention, the wire present as a device for monitoring the temperature or the tube present as a device for monitoring the temperature is arranged in the radial direction within the coils of at least one coiled electrical heating element. Possible local malfunctions can be especially readily detected at this position. This is especially the case when the electrical heating element is wound onto a coil body and when the wire present as a device for monitoring the temperature or the tube present as a device for monitoring the temperature runs in a hole or opening of the coil body in at least some sections.

For all embodiments of the present invention, in which the wire present as a device for monitoring the temperature or the tube present as a device for monitoring the temperature is made of cold-conducting material, it has proven to be especially successful when the material of the electrical heating element is an alloy containing chromium and nickel or an alloy containing copper and nickel and when the material of the wire present as a device for monitoring the temperature or of the tube present as a device for monitoring the temperature is a pure metal, especially nickel, refined nickel or highly refined nickel. When there are a plurality of such devices for monitoring the temperature, a plurality of different pure metals may optionally also be used.

The electrical heater according to the present invention comprises an electrical cartridge type heater with an outer metallic jacket and at least one electrical heating element arranged in an interior space of the outer metallic jacket, in which electrical heating element at least one device for monitoring the temperature, which is galvanically separated from the electrical heating element and which is configured as at least one wire present in addition to the electrical heating element or a tube present in addition to the electrical heating element, is arranged in the interior space of the metallic jacket of the electrical heating element. In this connection, the wire or the tube is each made either of a cold-conducting material or of a heat-conducting material, wherein the absolute value of the temperature coefficient of the electrical resistance is greater than 800 ppm/K, especially preferably greater than 4,000 ppm/K between 20° C. and 105° C. for this heat-conducting or cold-conducting material when it is a cold-conducting material and greater than 250 ppm/K, especially preferably greater than 800 ppm/K, especially most preferably greater than 4,000 ppm/K when it is a heat-conducting material. Furthermore, the wire or the tube is embedded directly into an electrically non-conducting filler filling the remaining interior space of the outer metallic jacket.

In addition, the electrical heater according to the present invention has a power supply for energizing the at least one electrical heating element and a device for determining the resistance of the wire present as a device for monitoring the temperature or of the tube present as a device for monitoring the temperature and for assigning a temperature value to the determined resistance of the wire present as a device for monitoring the temperature or of the tube present as a device for monitoring the temperature.

It is especially preferred in this connection when the device for determining the resistance of the wire present as a device for monitoring the device or of the tube present as a device for monitoring the temperature and for assigning a temperature value to the determined resistance of the wire present as a device for monitoring the device or of the tube present as a device for monitoring the temperature with the power supply for energizing the at least one electrical heating element is in signal communication, so that the energizing of the at least one electrical heating element can be changed as a function of the temperature value assigned to the resistance value by the device for determining the resistance.

The present invention is explained in detail below on the basis of figures, which show exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6*a* is a perspective view of a sixth electrical cartridge type heater;

FIG. 6*b* is an exploded view of the electrical cartridge type heater from FIG. 6*a;*

FIG. 6*c* is the electrical heating element from FIG. 6*a* in the unwound state;

FIG. 6*d* is a cross section through the electrical cartridge type heater from FIG. 6*a* in a direction at right angles to its direction of extension;

DESCRIPTION OF THE PREFERRED EMBODIMENTS

Figure 1A:
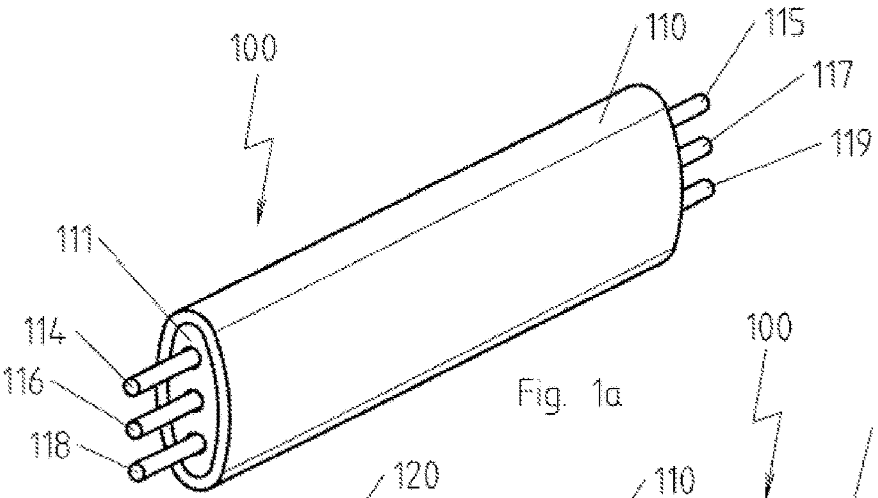
FIG. 1*a* is a perspective view of a first electrical cartridge type heater.

Referring to the drawings, FIG. 1*a* shows a first electrical cartridge type heater 100 with a metallic jacket 110 that is tubular in this example, with an oval cross section, which is closed on each end face by means of end caps 111, 112 that are each traversed by three connecting bolts 114-119. As the sectional view according to FIG. 1*b* shows, two electrical heating elements 120, 121, which are embodied as coiled hot wires, are arranged in the interior space 140 of the metallic jacket 110, preferably under mechanical tension, between the connecting bolts 114 and 115 or 118 and 119, while a device for monitoring the temperature 130 in the form of a coiled wire made of a cold-conducting material—(PTC material)—a material that has an electrical resistance that increases with increased temperature—or made of a heat-conducting material—(NTC material)—a material that has an electrical resistance that decreases with increased temperature—is arranged between the connecting bolts 116 and 117, preferably under mechanical tension, which device, to clarify that it is not a third electrical heating element and a different material forms the wire, is shown to be thinner than the electrical heating elements 120, 121, which, however, shall not be understood here as in all other figures to be an indication of a necessary difference with respect to the necessary dimensioning, especially with respect to the cross section.

The preferably crimped insulating material, which may consist, e.g., of MgO powder or granules, actually filling the interior space 140 of the respective metallic jacket 110 is not shown in this figure as well as in all other figures for the sake of clarity.

Figure 2A:
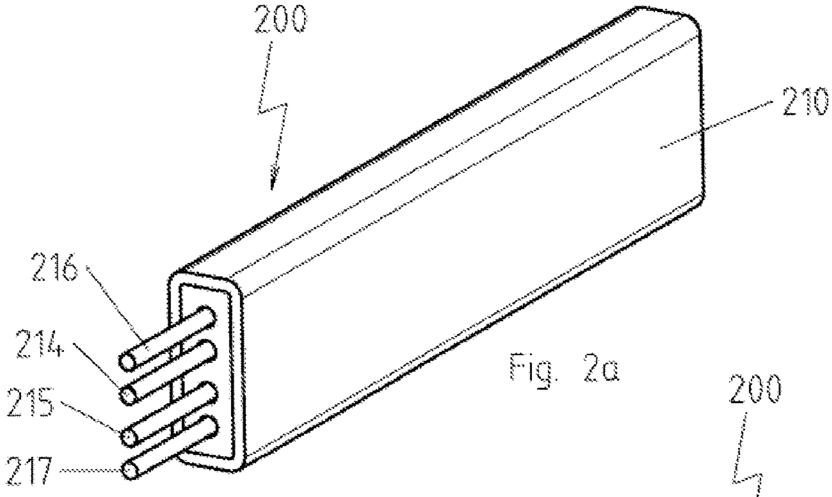
FIG. 2*a* is a perspective view of a second electrical cartridge type heater.

FIG. 2*a* shows a second electrical cartridge type heater 200 with a metallic jacket 210, which is tubular in this example, with an essentially rectangular cross section with rounded corners, which is closed on one side on the end face by a bottom 211. On the other end face, four connecting bolts 214-217 lead into the interior space 240 of the metallic jacket 210. As the sectional view according to FIG. 2*b* shows, an electrical heating element 220, which is embodied as a coiled hot wire and which runs in an approximately U-shaped manner through the interior space 240 of the metallic jacket 210, is arranged between the connecting bolts 214 and 215, while a device for monitoring the temperature 230 in the form of a coiled wire, which is made of a cold-conducting material or made of a heat-conducting material, is arranged between the connecting bolts 216 and 217, which device, to clarify that it is not a second electrical heating element and a different material forms the wire, is shown to be thinner than the electrical heating element 220 and likewise runs in an approximately U-shaped manner.

Figure 1B:
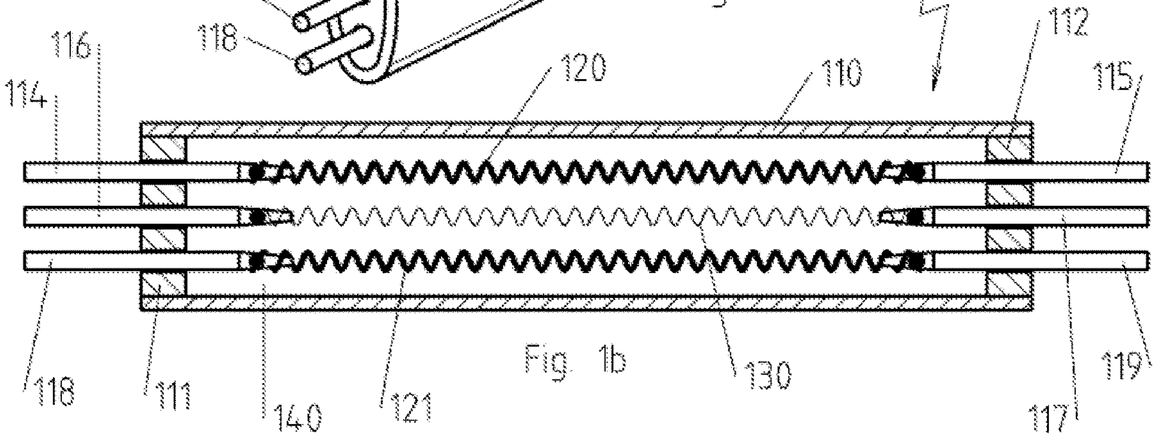
FIG. 1*b* is a section through the electrical cartridge type heater from FIG. 1*a* in a direction parallel to its direction of extension.
Figure 2B:
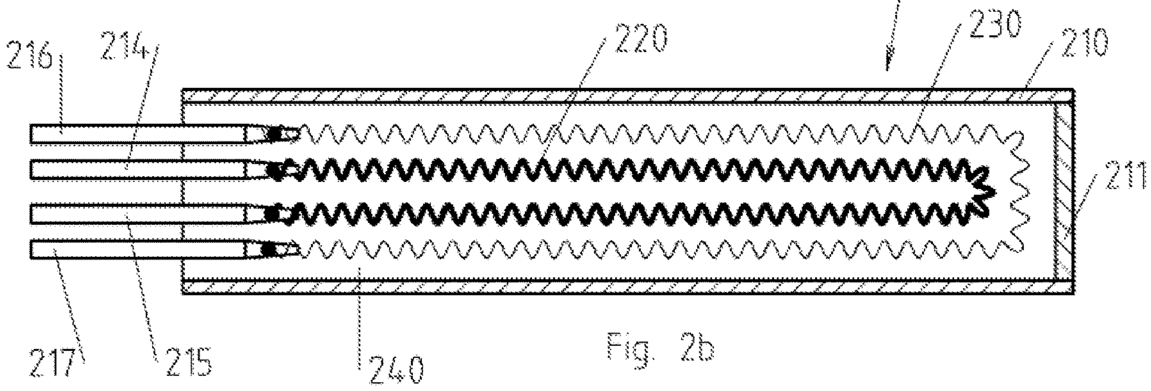
FIG. 2*b* is a section through the electrical cartridge type heater from FIG. 2*a* in a direction parallel to its direction of extension.

In contrast to the electrical cartridge type heater 100 to be connected on both sides shown in FIGS. 1*a* and 1*b*, the electrical cartridge type heater 200 according to FIGS. 2*a* and 2*b* is thus a cartridge type heater 200 to be connected on one side; further, the electrical cartridge type heaters 100, 200 differ with respect to their cross section.

Figure 3:
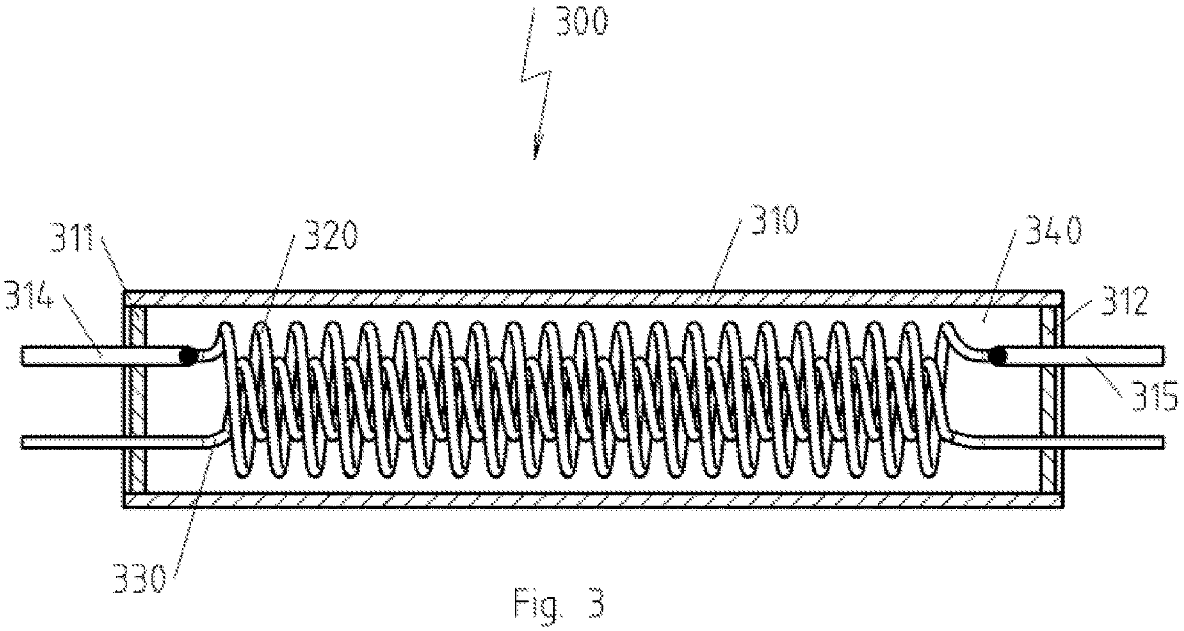
FIG. 3 is a section through a third electrical cartridge type heater in a direction parallel to its direction of extension.

The electrical cartridge type heater 300 shown in a sectional view in FIG. 3 includes a tubular metallic jacket 310, end caps 311, 312, which is embodied as a coiled, preferably self-supporting hot wire, which is arranged in the interior space 340 of the metallic jacket 310, an electrical heating element 320, which is arranged between the connecting bolts 314 and 315 and a device for monitoring the temperature 330 which is arranged in the interior space 340 of the metallic jacket 310 in the form of a coiled wire made of a cold-conducting material or made of a heat-conducting material, the ends of which lead directly out of the tubular metallic jacket 310 and are thus not provided with connecting bolts. The special feature of the embodiment according to FIG. 3 is that the device for monitoring the temperature 330 is arranged coaxially within the coils of the electrical heating element 320, which makes possible a very high sensitivity and an especially fast response of the device for monitoring the temperature 330 to a local failure of the electrical heating element 320.

Figure 4A:
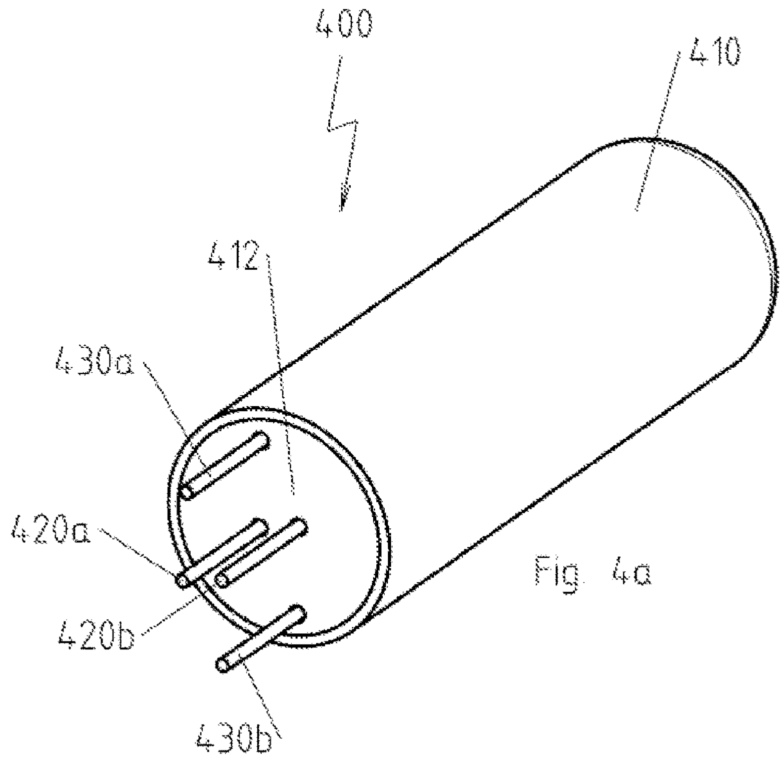
FIG. 4*a* is a perspective view of a fourth electrical cartridge type heater.
Figure 4B:
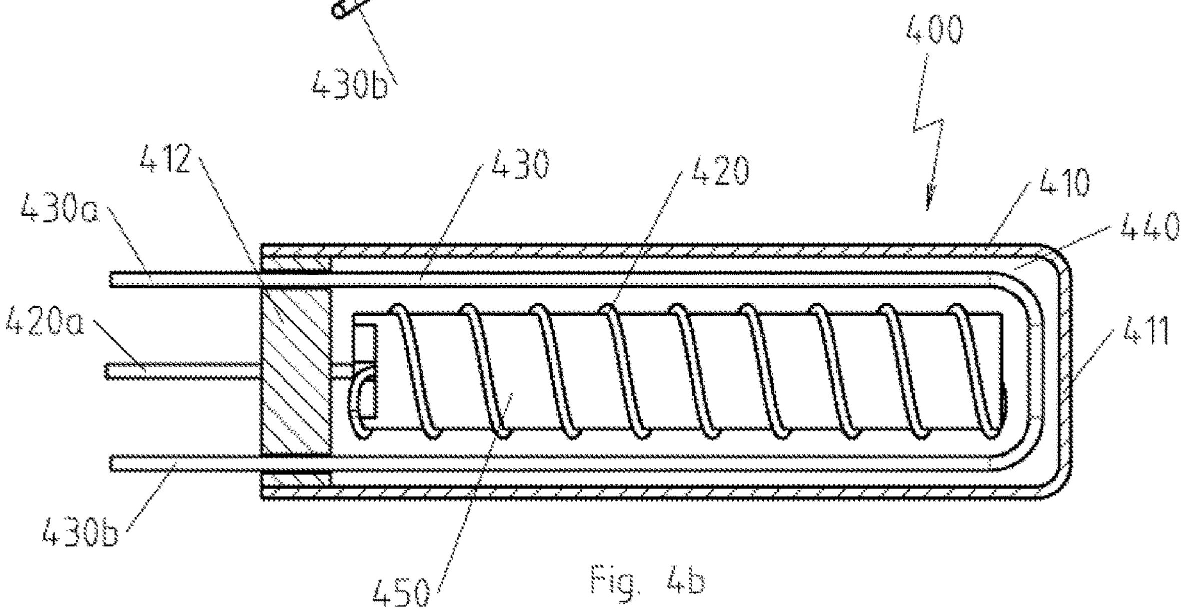
FIG. 4*b* is a section through the electrical cartridge type heater from FIG. 4*a* in a direction parallel to its direction of extension.

In the fourth electrical cartridge type heater 400 shown in FIG. 4*a* and FIG. 4*b*, the tubular metallic jacket 410 is cylindrical and closed with a bottom 411 formed in one piece with it as well as with an end cap 412. The electrical heating element 420, which is arranged in the interior space 440 of the tubular metallic jacket 410 and is embodied as a coiled hot wire wound onto a coil body 450, is passed through the end cap 412 with its ends 420*a*, 420*b*. The ends 430*a*, 430*b* of the device for monitoring the temperature 430, which is embodied here in the form of a U-shaped coiled wire made of a cold-conducting material or made of a heat-conducting material lying in a central plane of the coil body 450, are also passed through the end cap 412.

Figure 5A:
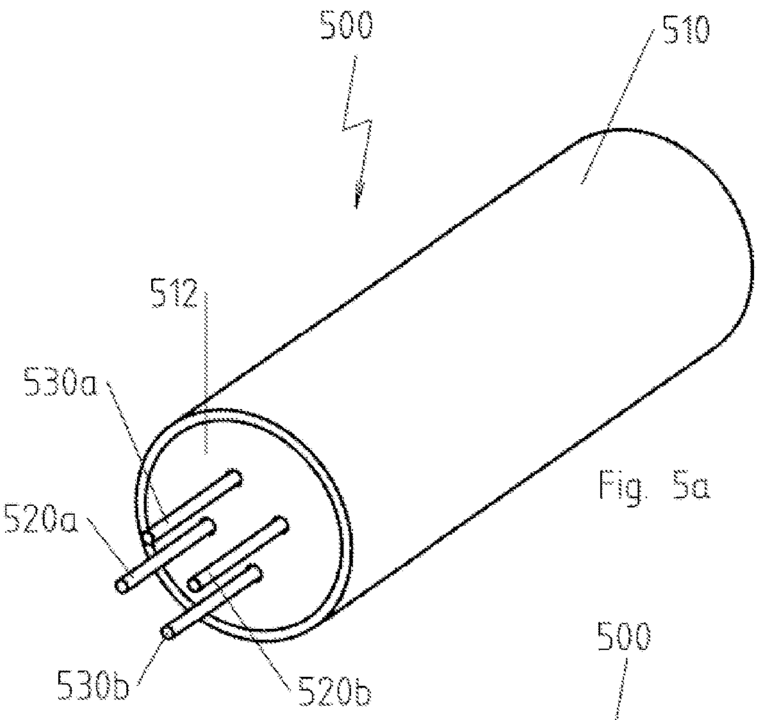
FIG. 5*a* is a perspective view of a fifth electrical cartridge type heater.
Figure 5B:
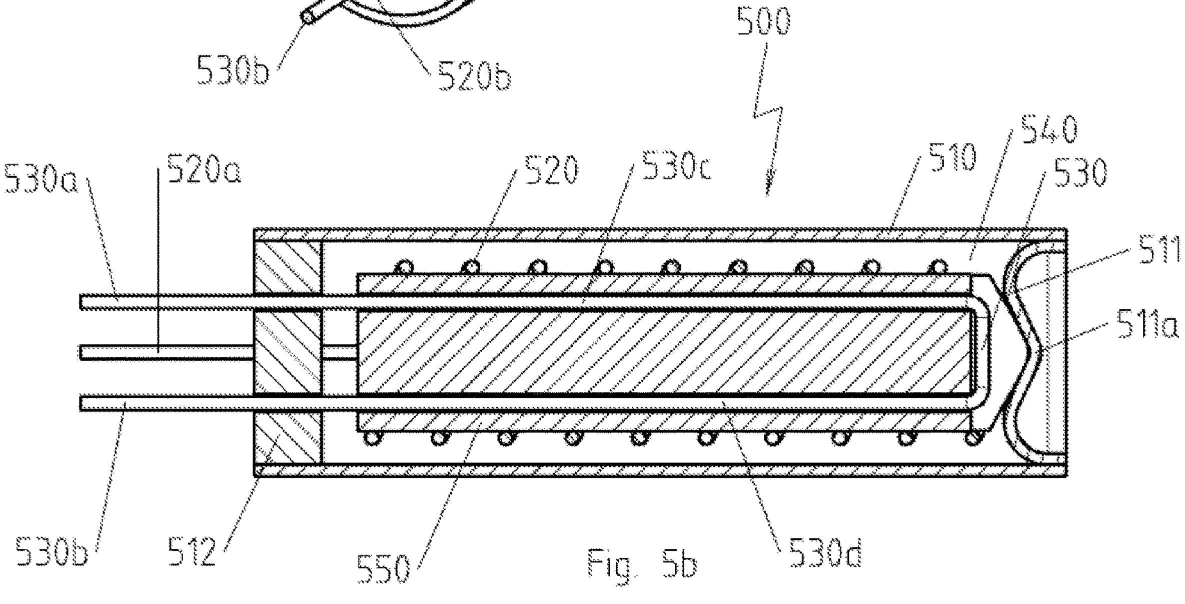
FIG. 5*b* is a section through the electrical cartridge type heater from FIG. 5*a* in a direction parallel to its direction of extension.

In the fifth electrical cartridge type heater 500 shown in FIG. 5*a* and FIG. 5*b*, the tubular metallic jacket 510 is likewise cylindrical and closed with a bottom 511 as well as an end cap 512, the bottom 511 having a recess 511*a* as a positioning aid for a coil body 550. As in the electrical cartridge type heater 400 according to FIGS. 4*a,b*, the electrical heating element 550, which is arranged in the interior space 540 of the tubular metallic jacket 510 and which is embodied as a coiled hot wire wound onto a coil body 550, is passed through the end cap 512 with its ends 520*a*, 520*b*. Also passed through the end cap 512 are the ends 530*a*, 530*b* of the device for monitoring the temperature 530, which is embodied here in the form of a U-shaped, coiled wire made of a cold-conducting material or made of a heat-conducting material, lying in a central plane of the coil body 550, wherein the sections 530*c*, 530*d* of the device for monitoring the temperature 530 forming the two legs of the U are passed through holes in the coil body and thus are arranged radially within the turns or coils of the electrical heating element 520 wound onto the coil body 550.

FIGS. 6*a* through 6*d* show a sixth exemplary embodiment of an electrical cartridge type heater 100. As is especially readily seen in the exploded view of FIG. 6*b*, the electrical cartridge type heater 600 has an electrical heating element 620, which is arranged between an outer metallic jacket 610 and an inner metallic jacket 660, which are connected to one another by means of a bottom surface 661 facing away from the viewer and hence not visible in FIG. 6*a*. As can be readily seen in FIG. 6*a*, the electrical heating element 620 is arranged in the interior space 640 of the outer metallic jacket 610 between an outer shaped ceramic part 670, which at the same time guarantees an electrical insulation to the outer metallic jacket 610, and a central shaped ceramic part 671, and is optionally additionally embedded in an electrically insulating material, not shown, e.g., MgO granules, which, however, is not shown in FIGS. 6*a* through 6*c* for the sake of clarity.

In addition, a device for monitoring the temperature 630, which is embodied in the form of a wire made of a cold-conducting material or made of a heat-conducting material, is arranged between the central shaped ceramic part 671 and an inner shaped ceramic part 672, the wire likewise depicting a space curve, which can be obtained by winding a basic shape in a meandering pattern. It is preferred in this case when the space curve, which depicts the device for monitoring the temperature 630, can be converted, by scaling in the radial direction, into the space curve, which depicts the electrical heating element 620. Further, it is preferred when an alignment is present, in which points corresponding to one another in the same direction of curved arcs 628, 629 or 638, 639 of the meandering structures of the device for monitoring the temperature 630 or of the electrical heating element 620 lie each on a common radius r, as is shown by example in FIG. 6*d*. In this way, a section of the device for monitoring the temperature 630 is directly assigned to each section of the electrical heating element 620, which leads to especially reliable detection of temperature deviations.

The end face of the electrical cartridge type heater 600, which can be seen by the viewer in FIG. 6*a*, is closed with a circular-ring-shaped cap 662 in the assembled state. The outer metallic jacket 610 and the inner metallic jacket 660 are each configured as a cylindrical tube and are arranged concentrically to one another. The direction of extension of the outer metallic jacket 610 and of the inner metallic jacket 660 is thus predefined by the cylinder axis.

As can be especially readily seen in FIG. 6*c*, which shows the electrical heating element 620 in the wound or unwound state, i.e., not in the state, in which it is installed, the electrical heating element has a meandering shape with meandering loops. A connecting bolt 614, 615 each with a hole, which cannot be seen in FIG. 6*c*, into which an end section of the electrical heating element 620 is received and electrically contacted, is at both ends of the electrical heating element 620.

Figure 7A:
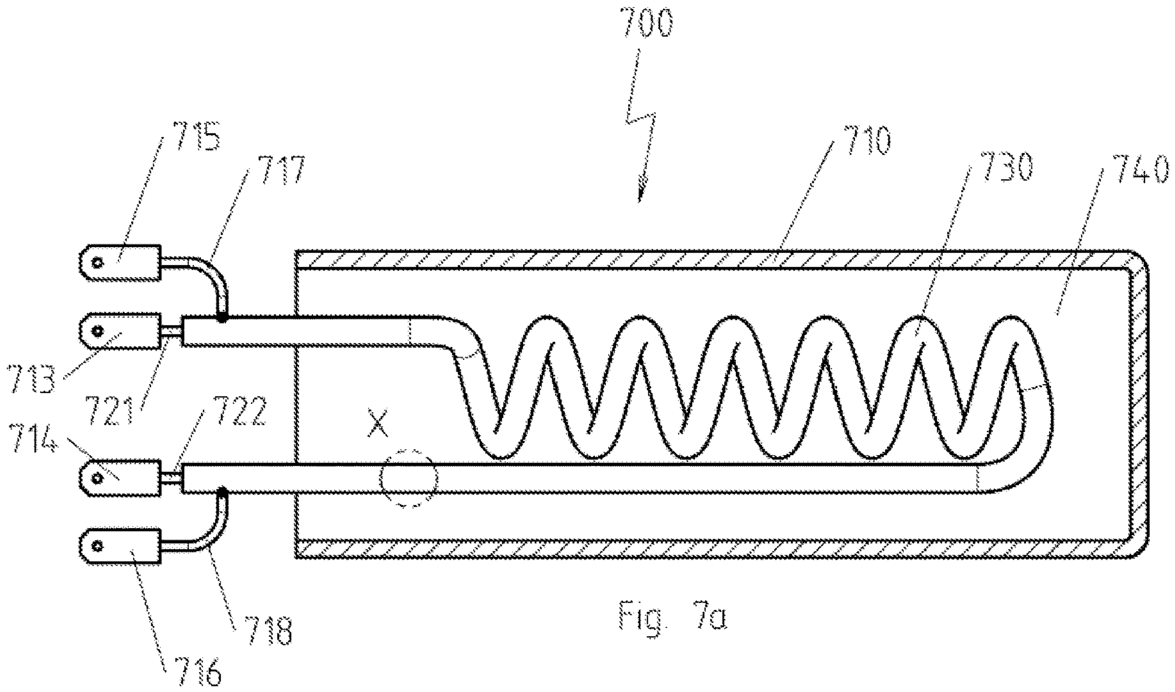
FIG. 7*a* is a section through a third electrical cartridge type heater in a direction parallel to its direction of extension.
Figure 7B:
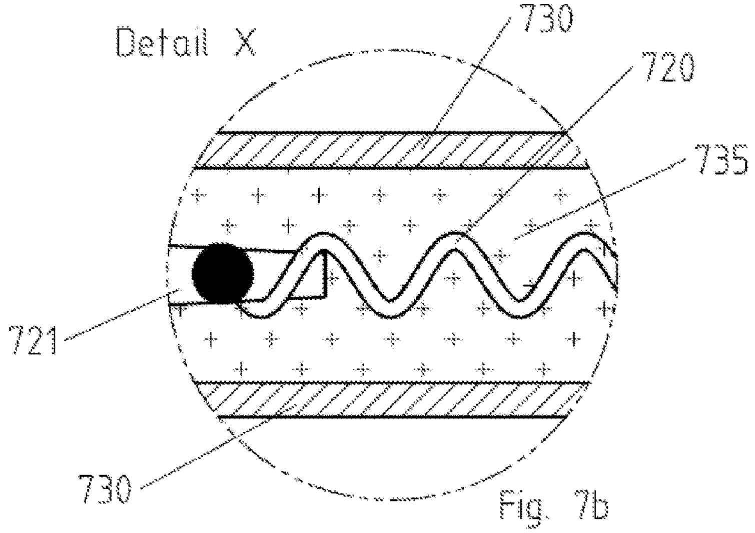
FIG. 7*b* is a first enlarged detail view from FIG. 7*a;*
Figure 7C:
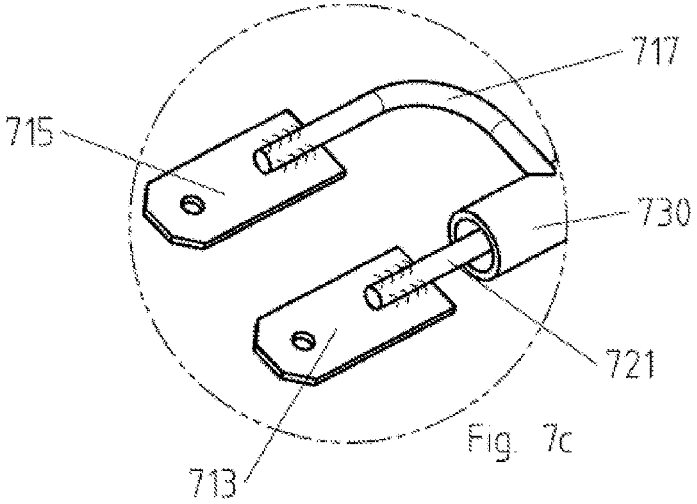
FIG. 7*c* is a second enlarged detail view from FIG. 7*a*.

In the electrical cartridge type heater 700 shown in FIGS. 7*a* through 7*c*, as can be especially readily seen in the detailed view of FIG. 7*b*, the electrical heating element 720 is arranged in the form of a hot wire centrally in the interior of a device for monitoring the temperature, which device is embodied as a tube made of a cold-conducting material or made of a heat-conducting material and is electrically insulated from same with magnesium oxide powder 735. Thus, the electrical heating element 720 and the device for monitoring the temperature together form a coiled tube cartridge, which is arranged in some sections coiled in the interior space 740 of a cup-shaped outer metallic jacket 710. The filling, consisting of a readily heat-conducting, preferably electrically non-conducting material, especially MgO powder or granulates, filling this interior space and ensuring the heat conduction to the cup-shaped metallic jacket 710, has been omitted for the sake of clarity. Contact plates 713, 714 and connecting bolts 721, 722 are provided for contacting the electrical heating element 720. The contacting of the device for monitoring the temperature 730 is carried out via contact plates 715, 716 and connecting wires 717, 718, as can be especially readily seen in FIG. 7*c*.

Figure 8:
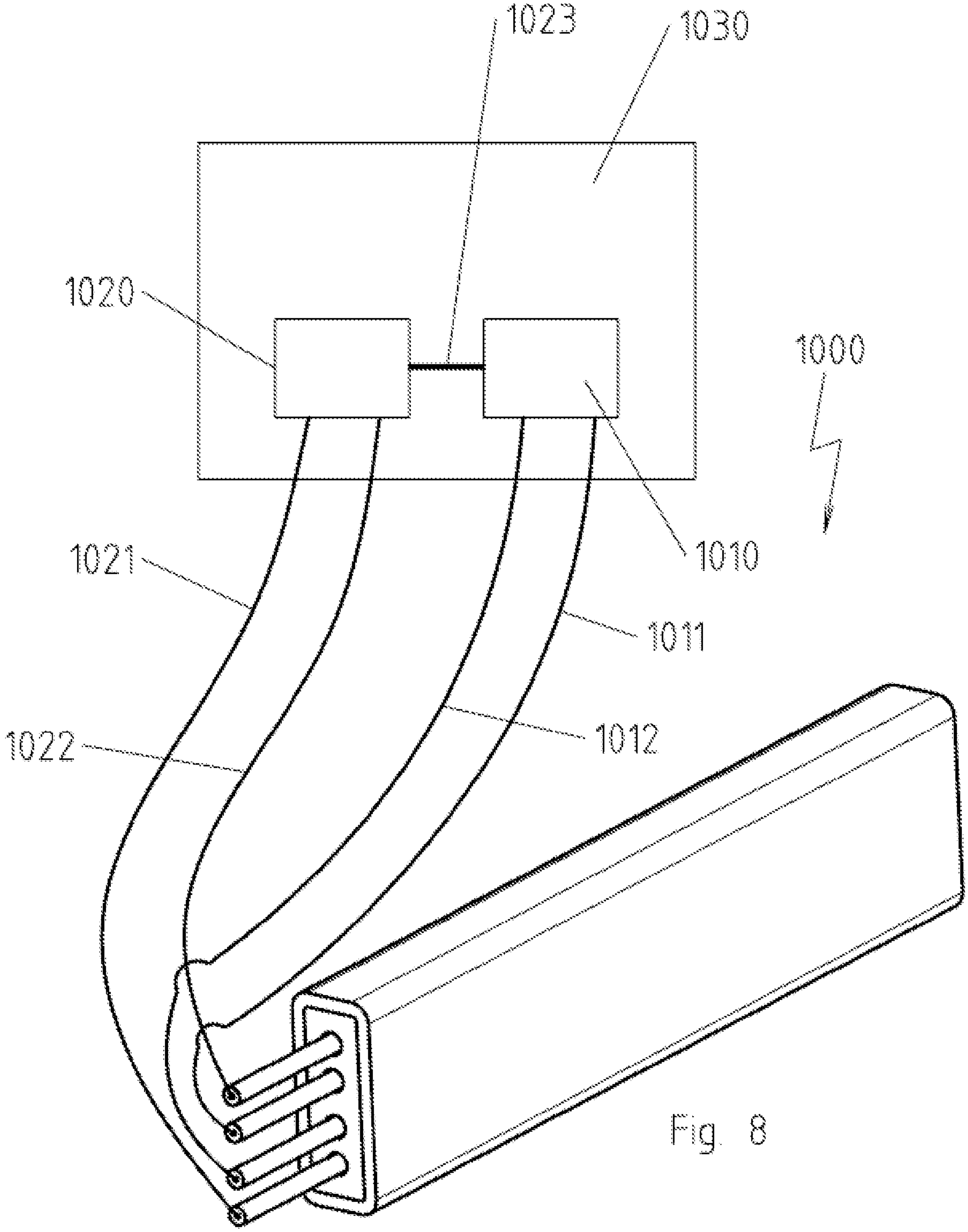
FIG. 8 is a schematic perspective view an electrical heater.

The electrical heater 1000 shown in FIG. 8 has, besides an electrical cartridge type heater 200, as it was already described above on the basis of FIGS. 2*a,b* and which was hence identified in FIG. 8 with the same reference numbers as in FIGS. 2*a,b*, a power supply 1010 for energizing the at least one electrical heating element 220 and a device for determining the resistance 1020 of the wire present as a device for monitoring the temperature 230 and for assigning a temperature value to the determined resistance of the device for monitoring the temperature, which are both combined in a control device 1030 in this example. Accordingly, the power supply 1010 and the electrical heating element 220 are connected to one another by electrical lines 1011, 1012 via the connecting bolts 214, 215, and the device for determining the resistance 1020 and the device for monitoring the temperature 230 are connected to one another by electrical lines 1021, 1022 via the connecting bolts 216, 217.

In addition, the device for determining the resistance 1020 of the device for monitoring the temperature 230 is in signal communication with the power supply 1010 via a signal line 1023, so that the energizing of the at least one electrical heating element 220 can be changed as a function of the temperature value assigned to the resistance value by the device for determining the resistance 1020.

While specific embodiments of the invention have been shown and described in detail to illustrate the application of the principles of the invention, it will be understood that the invention may be embodied otherwise without departing from such principles.

APPENDIX

List of Reference Characters

100, 200, 300, 400, 500,
600, 700 Electrical cartridge type heater
110, 210, 310, 410, 510,
610, 710 Outer metallic jacket
111, 112, 311, 312, 412,
512 End caps
114, 115, 116, 117, 118,
119, 214, 215, 216, 217,
314, 315, 721, 722 Connecting bolt
120, 121, 220, 320, 420,
520, 620, 720 Electrical heating element
130, 230, 330, 430, 530,
630, 730 Device for monitoring the temperature
140, 240, 340, 440, 540,
640, 740 Interior space
211, 411, 511 Bottom
420*a*, 420*b*, 520*a*, 520*b* End
430*a*, 430*b*, 530*a*, 530*b* End
450, 550 Coil body
511*a* Recess
530*c*, 530*d* Section
628, 629 Arc
638, 639 Arc
660 Inner metallic jacket
661 Bottom surface
670 Outer shaped ceramic part
671 Middle shaped ceramic part
672 Inner shaped ceramic part
713, 714, 715, 716 Contact plate
717, 718 Connection wire
735 Magnesium oxide powder
1000 Electrical heater
1010 Power supply
1011, 1012, 1021, 1022 Electrical line
1020 Device for determining the resistance
1023 Signal line
1030 Control device
r Radius

What is claimed is:

1. An electrical cartridge heater comprising:

an outer jacket with an interior space;

an electrical heating element arranged in said interior space of said outer jacket, said heating element being formed in a cylindrical shape, said electrical heating element being arranged in a meandering pattern with said meandering pattern being arranged on a circumferential surface of said cylindrical shape;

a temperature monitoring device arranged in said interior space of said outer jacket, said temperature monitoring device comprising a wire or tube arranged in a meandering pattern, said temperature monitoring device in said meandering pattern being formed in a cylindrical shape with said meandering pattern being arranged on a circumferential surface of said cylindrical shape, said cylindrical shape of said temperature monitoring device being arranged coaxial with said cylindrical shape of said electrical heating element, said cylindrical shape of said temperature monitoring device being arranged radially inside said cylindrical shape of said electrical heating element, said wire or tube being made of a material that has an electrical resistance that increases with increased temperature, with a positive temperature coefficient, or that has an electrical resistance that decreases with increased temperature, with a negative temperature coefficient, an absolute value of the temperature coefficient of the electrical resistance being greater than 800 ppm/K, between 20° C. and 105° C.;

an electrically non-conducting filler arranged between each of said outer jacket, said electrical heating element and said temperature monitoring device.

2. An electrical cartridge heater in accordance with claim 1, wherein the wire or the tube is made of a material, the resistance of which has a temperature coefficient, the value of which in the range between 20° C. and 105° C. is at least twice as high as the value of the temperature coefficient of the resistance of the electrical heating elements in the range between 20° C. and 105° C.

3. An electrical cartridge heater in accordance with claim 1, wherein the electrical cartridge type heater is compressed or crimped in at least some sections and the wire or the tube extends in at least one compressed or crimped section.

4. An electrical cartridge heater in accordance with claim 1, wherein the temperature monitoring device is configured as the tube and the tube is made of a material that has an electrical resistance that increases with increased temperature, with a positive temperature coefficient, or that has an electrical resistance that decreases with increased temperature, with a negative temperature coefficient, and that the electrical heating element is arranged in an interior space of the tube such that the tube forming the device for monitoring the temperature and the electrical heating element together form a coiled tube cartridge.

5. An electrical cartridge heater in accordance with claim 1, wherein the at least one electrical heating element comprises an alloy containing chromium and nickel or an alloy containing copper and nickel, and the wire or the tube is a pure metal comprised of nickel, refined nickel or highly refined nickel.

6. An electrical cartridge heater in accordance with claim 1, wherein the electrical resistance is greater than 4,000 ppm/K.

7. An electrical cartridge heater in accordance with claim 1, wherein:

said electrical heating element is a wire;

said meandering pattern of said electrical heating element, and said meandering pattern of said temperature monitoring device are aligned.

8. An electrical cartridge heater in accordance with claim 7, wherein:

said temperature monitoring device is aligned with said electrical heating element for a majority of extent of said electrical heating element.

* * * * *